Oct. 28, 1969  C. R. PETTIS, JR  3,474,874
WEIGHING SYSTEM
Filed June 21, 1967  8 Sheets-Sheet 1
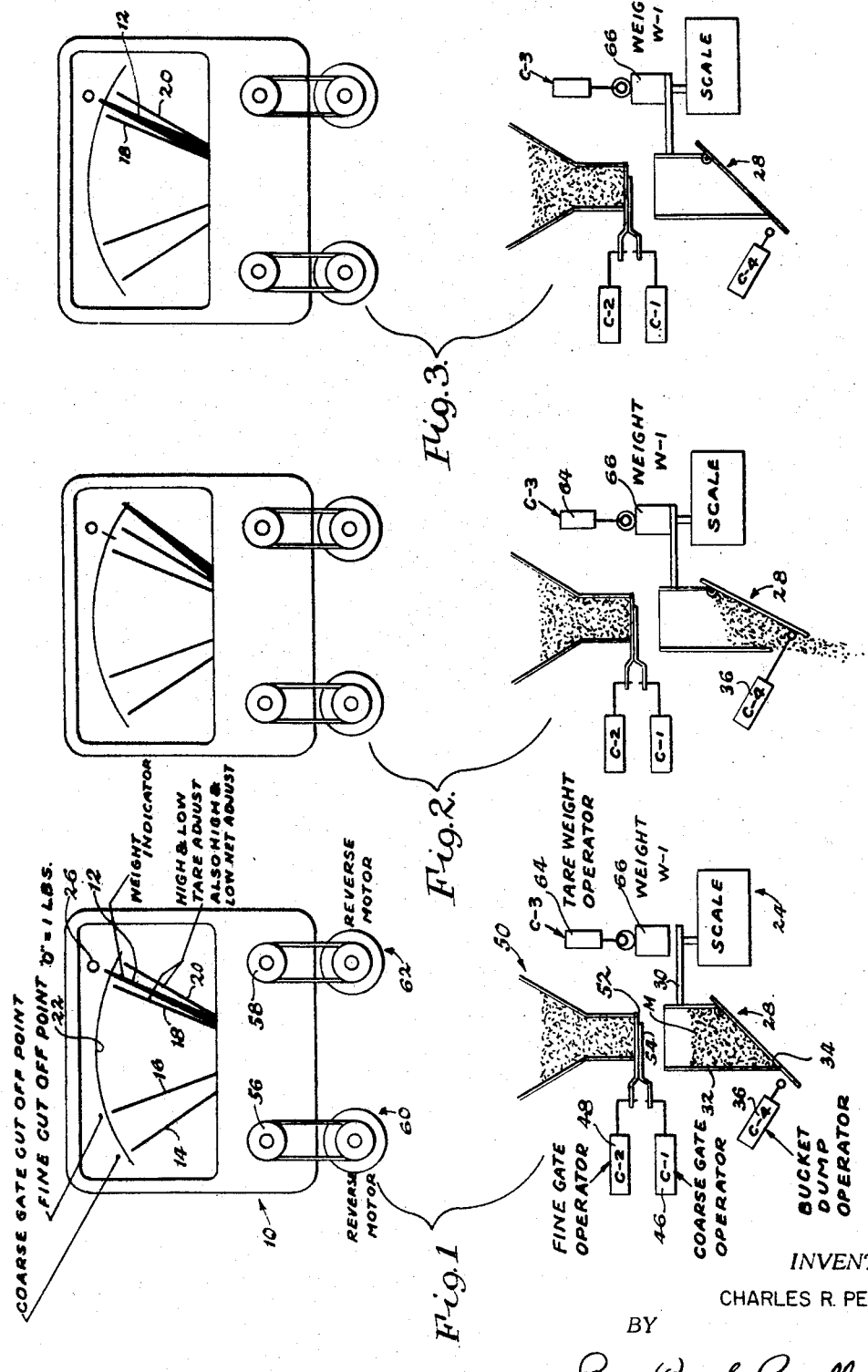
INVENTOR.
CHARLES R. PETTIS, JR.
BY
Bean, Brooks, Buckley & Bean
ATTORNEYS

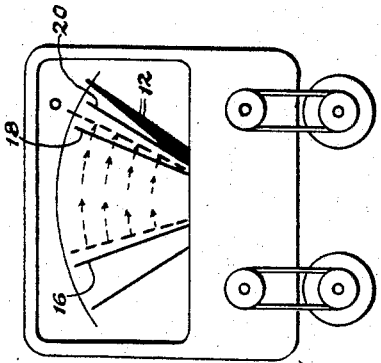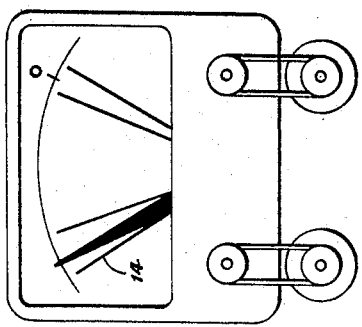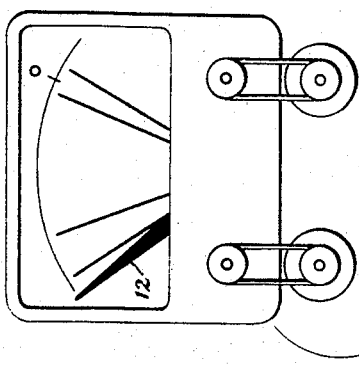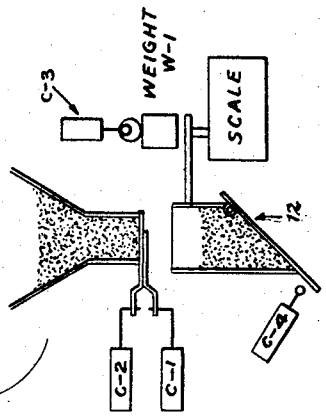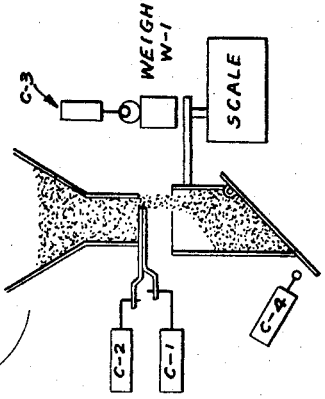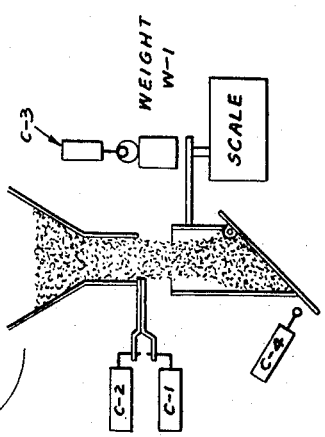
Fig. 6. VI FINE GATE CLOSED— POINTER COMES TO REST
Fig. 5. V BULK GATE CLOSED— FINE FILL CONTINUES
Fig. 4. IV REMOVE W-1 BOTH GATES OPEN—FILL
INVENTOR.
CHARLES R. PETTIS, JR.
ATTORNEYS Oct. 28, 1969     C. R. PETTIS, JR     3,474,874
WEIGHING SYSTEM
Filed June 21, 1967     8 Sheets-Sheet 3
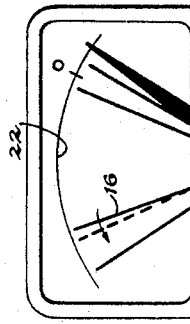
Fig. 7.
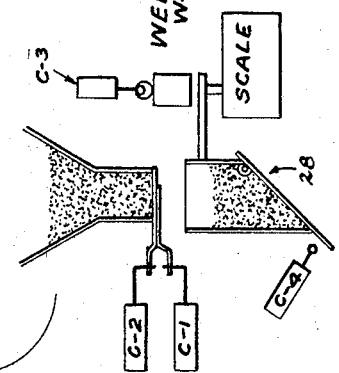
VII POINTER SHOWS HEAVY NET-WHEN SYSTEM INTERROGATED FINE GATE CUT OFF WILL BE MOTOR DRIVEN TO CORRECT SUBSEQUENT WEIGHTS
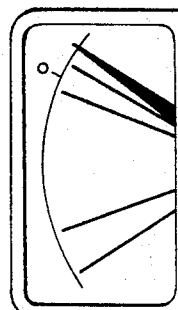
Fig. 8.
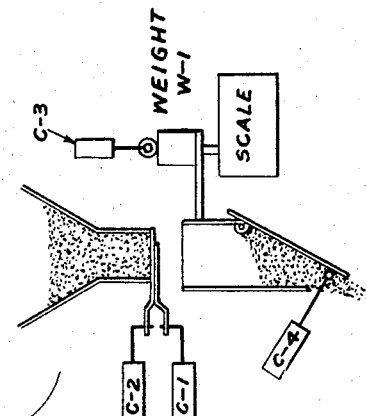
VIII DUMP & ADD 1 LB. WEIGHT
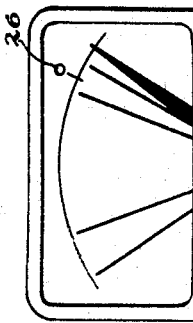
Fig. 9.
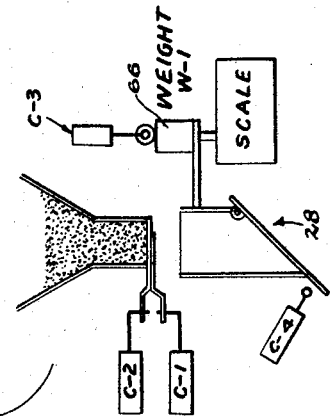
IX TARE SHIFT SHOWN WHEN SYSTEM INTERROGATED SYSTEM ZERO WILL SHIFT FOR CORRECTION ON NEXT CYCLE
INVENTOR.
CHARLES R. PETTIS, JR.
BY
Bean, Brooks, Buckley + Bean
ATTORNEYS Oct. 28, 1969  C. R. PETTIS, JR  3,474,874
WEIGHING SYSTEM
Filed June 21, 1967  8 Sheets-Sheet 4
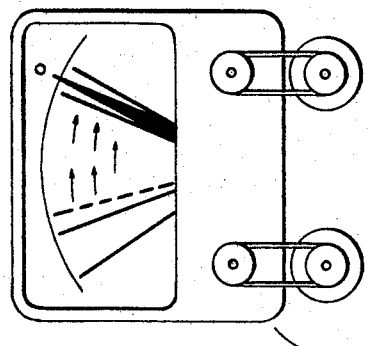
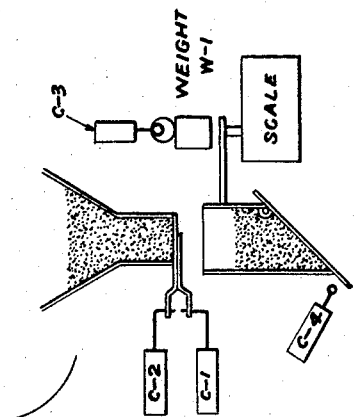
Fig.12.
XII FINE GATE CLOSED
POINTER COMES TO REST
WEIGHT O.K.
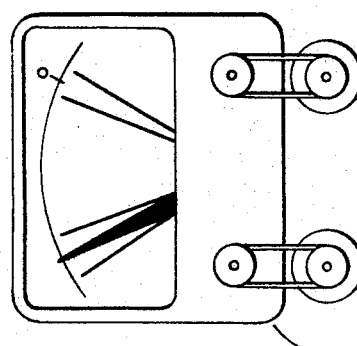
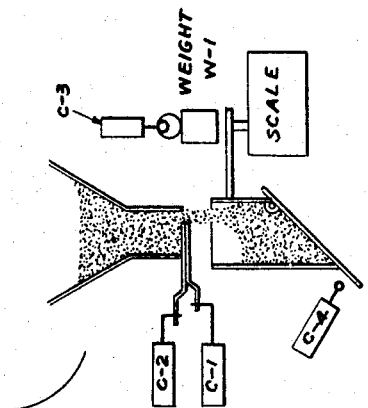
Fig.11.
XI BULK GATE CLOSED
FINE FILL CONTINUES
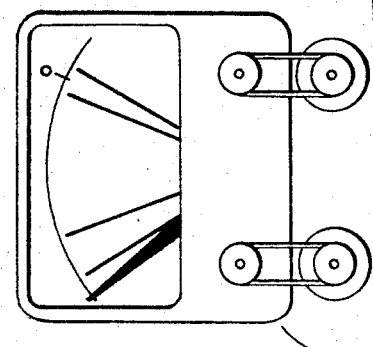
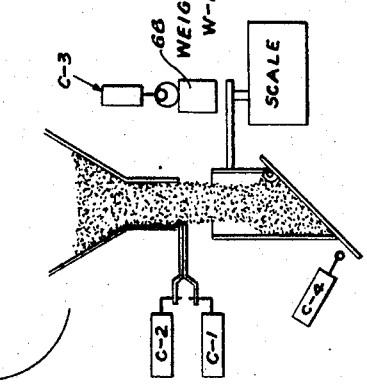
Fig.10.
X REMOVE W-1
BOTH GATES
OPEN-FILL
INVENTOR.
CHARLES R. PETTIS, JR.
BY
Bean, Brooke, Buckley & Bean
ATTORNEYS Oct. 28, 1969  C. R. PETTIS, JR  3,474,874
WEIGHING SYSTEM Filed June 21, 1967  8 Sheets-Sheet 5

INVENTOR.
CHARLES R. PETTIS, JR.
BY
Bean, Brooke, Buckley & Bean
ATTORNEYS

Oct. 28, 1969  C. R. PETTIS, JR  3,474,874
WEIGHING SYSTEM
Filed June 21, 1967  8 Sheets-Sheet 7
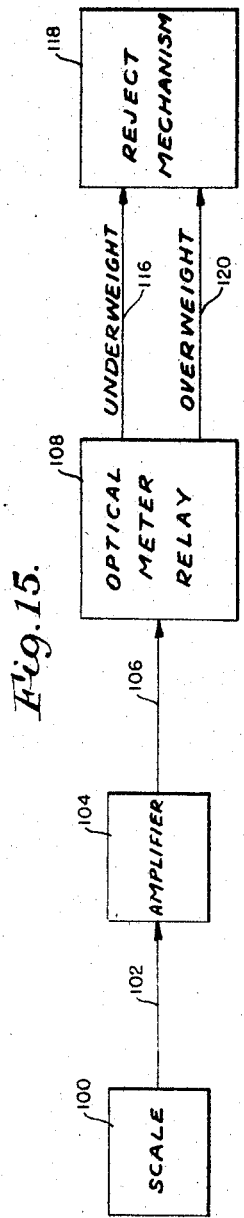
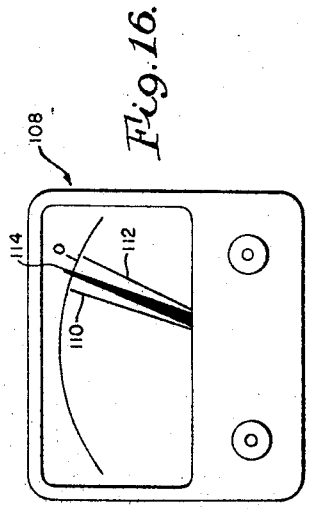
INVENTOR.
CHARLES R. PETTIS, JR.
BY
*Bean, Brooks, Buckley & Bean*
ATTORNEYS Oct. 28, 1969  C. R. PETTIS, JR  3,474,874
WEIGHING SYSTEM
Filed June 21, 1967  8 Sheets-Sheet 8
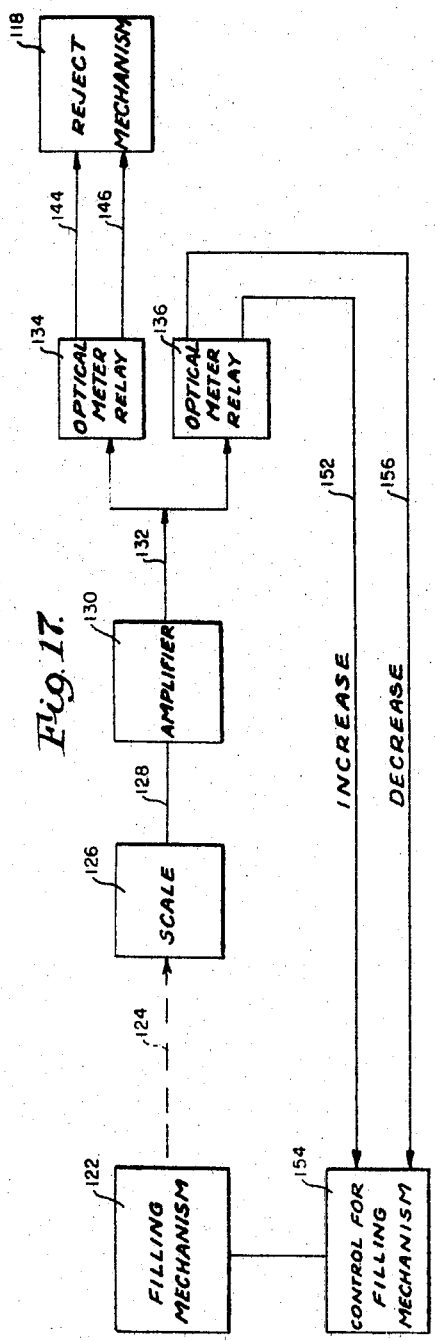
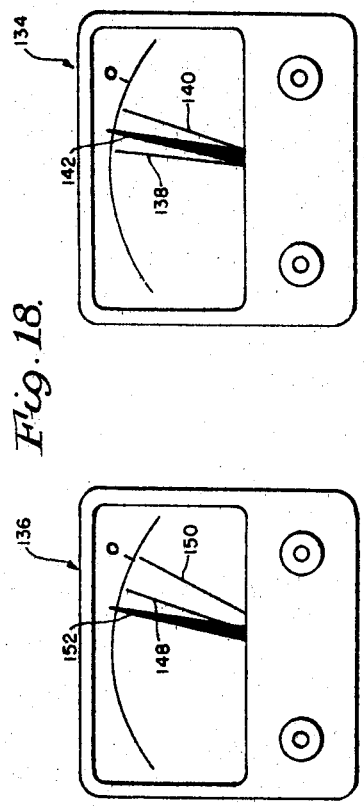
INVENTOR.
CHARLES R. PETTIS, JR.
BY
Bean, Brooke, Buckley & Bean
ATTORNEYS United States Patent Office 3,474,874
Patented Oct. 28, 1969

3,474,874
WEIGHING SYSTEM
Charles R. Pettis, Jr., Ithaca, N.Y., assignor to Hi-Speed Checkweigher Co., Inc., Ithaca, N.Y.
Filed June 21, 1967, Ser. No. 647,748
Int. Cl. G01g 19/52
U.S. Cl. 177—50                                  10 Claims

ABSTRACT OF THE DISCLOSURE

A scale is used having an electrical signal output proportional to weight on the scale. This signal is used to control sequential fast and slow feed of material and to adjust the termination of the slow feed if the final weight lies outside predetermined limits.

BRIEF SUMMARY OF THE INVENTION

This invention relates to checkweighing and to systems for cyclically dispensing a supply of particulate material into sequential batches of uniform weight and in particular is directed to means for accomplishing greater accuracy in either the checkweighing operation or both the checkweighing and filling operations.

In the package filling and related arts wherein a bulk source of product or material of particulate form is being handled, it is frequently necessary to dispense batches of uniform weight at high cyclic rates. In general there are two main types of dispensing or package filling systems termed volumetric filling systems and gravimetric filling systems. In volumetric filling, the bulk particulate source is dispensed by some suitable mechanism (an auger for example) which displays the ability to feed or displace predetermined fixed volumes upon cyclic actuation. In practical operation, both the flow characteristics and the bulk density of the produce will vary sufficiently to cause non-uniformity in batch weights. Conventionally, a subsequent checkweigher apparatus is used to segregate and reject all those batches which are either underweight or overweight with respect to some acceptable weight band embracing the ideal weight of the batches.

Conventional checkweighing subsequent to either gravimetric or volumetric filling does not offer a great deal of information to the operator. For example, although the operator may observe an unusual reject rate, say of underweight batches, and conclude that the filling operation may require upward adjustment, no information can be ascertained concerning the batches which are passed or accepted nor will the operator be aware of the amount by which any given reject varies from the ideal weight. Hence, the operator is able to ascertain an underweight or an overweight trend only after the trend has become a reality.

According to the precepts of the present invention such information is displayed visually and continuously and, as well, the display device may be used to control the preceding filling operation. That is to say, the present invention allows the operator to observe the actual weight of each package and to take such corrective action as may be indicated before a reject trend is established. Moreover, automatic detection and control may be used. For example, a tolerance band for detection and control may be used which is narrower and lies within the tolerance band used for rejection. In this way, filling control may be effected as a rejection trend occurs but before the trend has had an opportunity to exceed the reject tolerance.

With gravimetric filling, high speed operation necessitates such rapid flow or dispensing of the particulate bulk material that the termination of material flow to form each batch in response to the accumulating weight of material present in the batch-receiving apparatus becomes highly critical. This would not, in itself, defeat the formation of uniform batches were it not for the fact that the flow characteristics and/or bulk density of the material will vary from time to time for most materials under practical conditions.

Thus, with rapid material flow as described, the quantity of material which will be "in the air" at the instant the material flow is terminated and while the batch of particulate material is still approaching the predetermined batch weight thereof represents a substantial degree of potential inaccuracy.

That is to say, some finite amount of time is required for the material to flow from the dispensing apparatus and come to rest on the pile of material accumulating on the apparatus receiving the batch and thus be detected by the weight sensitive device. Therefore, at the instant the material flow is terminated, some of the material which ultimately forms a part of the batch will not have reached the pile of accumulating material (i.e., will be "in the air") and therefore cannot participate in the control of flow termination. The more rapidly a batch is formed, the greater will be the relative amount of material which is "in the air" as aforesaid.

It is, therefore, of primary concern in connection with this invention to provide an improved form of system wherein the dispensing operation involves an initial stage characterized by relatively high volume of flow and a terminal stage characterized by relatively low volume of flow, coupled with mechanism for controlling the periods of these stages and for making flow corrective adjustments, when necessary, on a cycle-to-cycle basis to provide high speed uniform batch weight operation.

The present invention envisages the combination, in a system such as generally described, of a scale or weighing device for weighing the commodity being dispensed and a combined indicator and control device associated therewith in which the combined indicator and control device incorporates a movable indicator having switch means associated therewith and operated in response to movement of the indicator past established points in the path swept by the indicator to terminate the initial and final stages of the dispersing operation, with the further provision of additional switch means for determining the accuracy of the final weight of the batch obtained coupled with control means for adjusting the dispensing control mechanism in accord with the final weight of the batch.

Another object of this invention involves a system such as has just been described with the further provision of means for checking tare weight on a cycle-to-cycle basis to avoid batch weight errors due to variations in tare weight.

A further object of this invention resides in the provision of a gravimetric filling system in which a weighing device is utilized in conjunction with an indicator-control mechanism having a movable indicator responsive to weight disposed upon the weighing device and in which the indicator is adjustable to sweep a greater or lesser distance in response to the accumulation of a fixed unit of weight on the weighing device. At established points in the indicator sweep path, control switching actions are initiated and one or more of these points is adjustable in fixed increments to correct the filling action on subsequent cycles where correction is required.

In this way, the indicator may be adjusted so that its deflection or sweep distance is effective, for a standard fixed corrective increment of indicator switch point movement, to obtain the desired change in batch weight in response to each standard indicator switch point corrective increment. On the other hand, the sweep distance of the indicator may be set so that equal subdivisions thereof convey some desirable intelligence in the event of an incorrect batch weight. As an example of the former, a standard indicator switch point corrective movement of $\frac{1}{10}$ inch will effect a 10% change of batch weight if the indicator sweep is one inch whereas if the indicator sweep is $\frac{1}{2}$ inch instead of one inch, the standard corrective movement ($\frac{1}{10}$ inch) will produce a batch weight change of 20% every time the corrective increment is applied. As an example of the latter, a batch of 10 pills may conveniently be set to produce a deflection of 10 indicator scale divisions so that any incorrect batch will read directly, by scale divisions, on the number of pills involved in the error.

More particularly, it is an object of this invention to provide an improved form of gravimetric filling system which employs a weighing device having a linearly variable differential transformer or similar device for producing an electrical signal output which is linearly variable with the measured weight and, in association therewith, an optical meter relay device (or similar device) having a movable hand or indicator and adjustable indicators for selecting switch points responsive to movement of the movable indicator therepast so as to control the aforesaid initial and terminal stages of the dispensing operation.

In effect, an underlying principle of this invention is to provide a novel type of gravimetric filling system which includes an indicator capable of independent adjustment so that the sweep or deflection of the indicator may be varied to spread or compress control switching actions and thereby provide great accuracy at high speed.

A further object is to provide an improved weight indicating device in which the indicator is adjustable to sweep a greater or lesser distance in response to a discrete change in weight applied to the weighing device.

Another object is to provide an improved checkweigher including an indicator which is adjustable to sweep a greater or lesser distance in response to a discrete change in weight applied to the weighing device.

Another object of the invention is to provide an improved weight indicating device in which the indicator is an optical meter relay provided with means for varying the sensitivity of the indicator so that an operator may visually check and manually correct the operation.

Another object of the invention resides in the provision of a checkweigher system including a variable sensitivity indicator having a plurality of outputs.

Other objects and advantages of this invention will appear from the specification hereinafter and the accompanying drawing, wherein:

FIGURES 1–12 inclusive are sequential diagrammatic illustrations indicating the operation of the net weighing system according to the present invention;

FIGURE 15 is a box diagram illustrating a checkweigher system according to the present invention;

FIGURE 16 illustrates the face of an optical meter relay as set up for the system of FIGURE 15;

FIGURE 17 is a box diagram illustrating a checkweigher system with filling station control according to this invention; and FIGURE 18 illustrates the optical meter relay set-up for the system of FIGURE 17.

Figure 13:
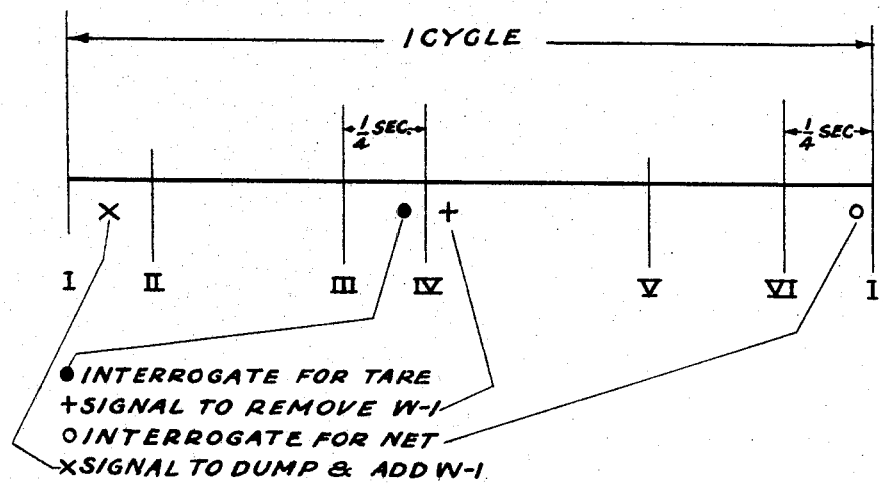
FIGURE 13 is a graph illustrating one cycle of operation.

Referring first to FIGURE 1 which illustrates an optical meter relay set up for use with a gravimetric filling system, the reference numeral 10 indicates therein an optical meter relay characterized by having a movable indicator hand 12 and a plurality of pointers 14, 16, 18 and 20. The optical meter relay is a contactless switch mechanism providing continuous indication through prismatic optics and solid state electronics and is of the type available from Assembly Products, Inc. of Chesterland, Ohio, and others. The optical meter relay includes a scale 22 over which the indicator 12 sweeps from left to right in FIGURE 1 in response to an increasing electrical signal from the weighing device indicated generally by the reference character 24. The zero point 26 on the optical meter relay scale is purely arbitrary and is designated as indicated only for convenience to illustrate that the desired predetermined net weight for the batch of particulate material being dispensed has been attained when the indicator 12 coincides therewith. The weighing device 24 is of conventional construction and embodies a linearly variable differential transformer transducer having an electrical signal output which is linearly related to the weight of material received in the bucket 28 attached to the scale mechanism through the arm 30 substantially as shown. The bucket includes a body portion 32 and a hinged bottom 34 normally urged to closed condition as shown but which may be actuated to open position by the actuator 36 to dump the contents of the bucket.

Thus, it will be recognized by those skilled in the art that the system shown in a net weighing gravimetric filling system. In such a system, the tare weight is the weight of the bucket 28, the net weight is the batch weight and gross weight is the sum of these two, tare plus net. The invention, however, is applicable to gross weighing gravimetric filling systems also.

Figure 14:
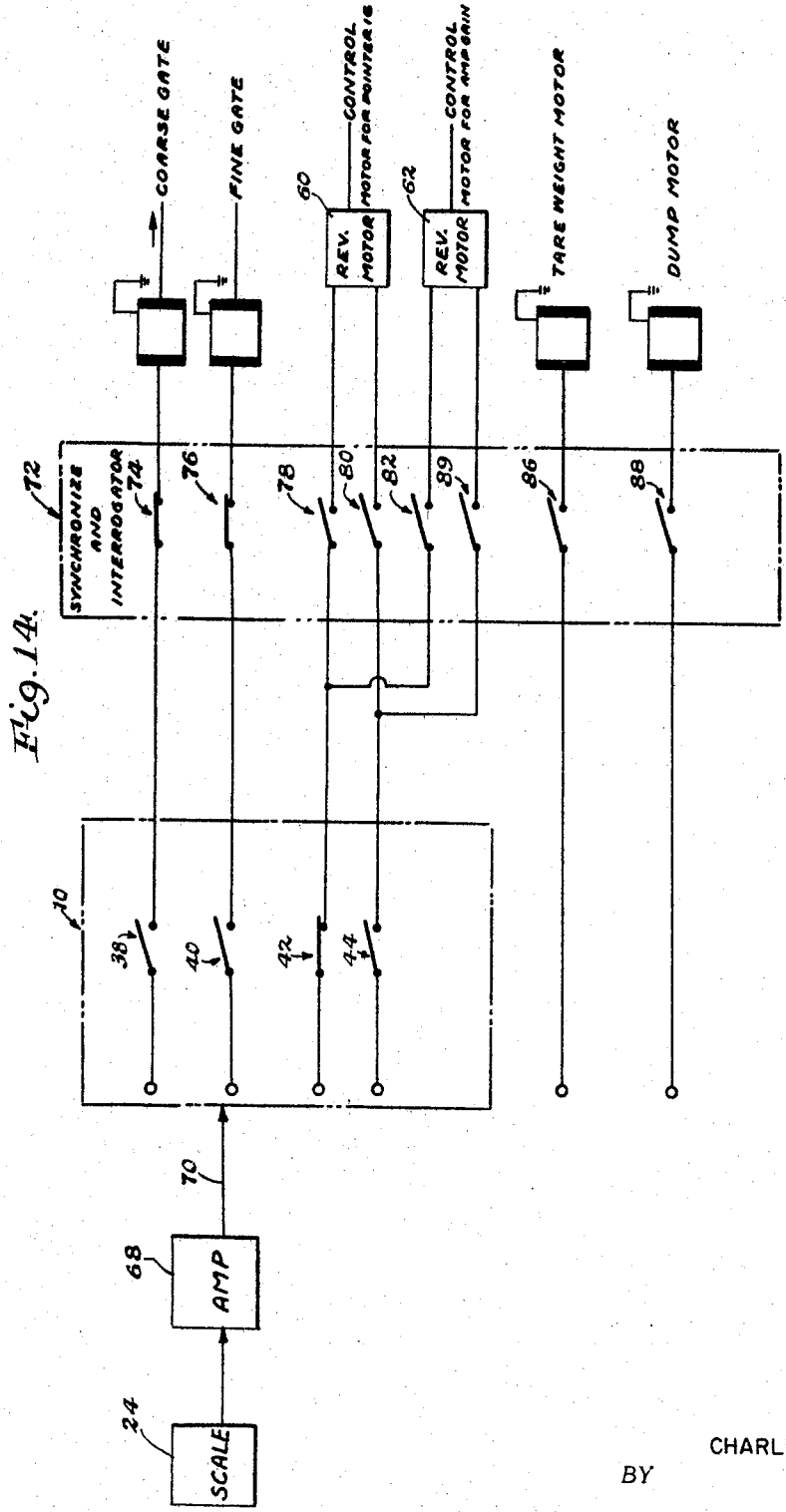
FIGURE 14 is a box diagram indicating the components of a preferred form of the invention.

As specified hereinabove, the optical meter relay is a contactless control and the purpose of the pointers 14, 16, 18 and 20 is to determine or establish the points at which various output circuits on the optical meter relay are actuated as the indicator 12 sweeps thereover. In FIGURE 14, the four switching actions effected by the pointers 14, 16, 18 and 20 are indicated respectively by the switch circuits 38, 40, 42 and 44 and it will be seen that the first two of these switching circuits are connected to the actuators 46 and 48 (see also FIGURE 1) which respectively operate the coarse gate and the fine gate of the dispensing hopper assembly indicated generally by the reference character 50. As diagrammatically shown in FIGURE 1, the coarse and fine gates may take the form merely of a pair of plates 52 and 54 normally disposed in completely covering relationship to the discharge mouth of the hopper assembly 50, substantially as is indicated in the drawings. However, other and different types of coarse and fine filling mechanism may be employed as, for example, separate feed belts of different widths, etc.

It will be understood that the pointers 14, 16, 18 and 20 may be moved to any desired positions along the scale 22 of the meter relay, the purpose for which being presently apparent. In addition to the above described mechanism, the optical meter relay includes a control knob 56 for selectively moving the fine gate control pointer 16. A control knob 58 is also provided to vary the sensitivity of the optical meter relay as by adjusting the gain of the amplifier driving the meter. That is to say, in conjunction with the control knob 58, assuming a fixed given weight to be present on the scale mechanism 24, rotation of the control knob 58 will cause the indicator 12 to move up or down the scale 22 to effectively compress or extend the scale length.

For automatic control of the pointer 16, or more particularly of its position relative to the scale 22, and to adjust the deflection of indicator 12 per weight unit and consequently the effective disposition of the zero point 26 on the scale 22, reversible motors 60 and 62 respectively are provided. These motors are coupled by chain and sprocket or pulley and belt devices to the respective control knobs 56 and 58. It will be understood that additional control knobs, not shown, are provided for moving the pointers 14, 18 and 20.

In addition to the above, there is provided a tare weight motor 64 which, when actuated, is adapted to place the tare weight member 66 on the scale for a purpose which will be presently apparent.

To appreciate better the operation of the device, reference will be had first of all to FIGURE 14. In this figure, a rather simplified circuit diagram is shown so as to clearly illustrate the principles of operation. As previously described, the scale device 24 includes a linearly variable differential transformer transducer or an equivalent mechanism which produces a weight responsive signal applied to an amplifier 68 which in turn supplies the amplified signal through control 70 to the optical meter relay or its equivalent. The optical meter relay shown and for the purposes of this discussion would include the four switches 38, 40, 42 and 44 of which the first three are normally closed. In FIGURE 14, the switch 38 is, however, shown as being open which designates that the indicator 12 has swept past the pointer 14 and has thus opened the switch 38. A synchronizer and interrogator device is indicated generally by reference character 72 in FIGURE 14 and will be seen to include the series of switches 74, 76, 78, 80, 82, 84, 86 and 88. All of these switches are normally open but are closed and permitted to reopen in timed relationship to establish the operation principle of this mechanism and, for this purpose, it will be evident that the switches may be opened and closed by a series of cams carried by a rotating shaft having the requisite cam elements thereon for controlling the opening and closing actions on a cyclic basis.

The shaft and its associated cams are driven in synchronization with that mechanism (not shown) which advances the empty packages or receptacles into registry beneath the bucket 28. As is conventional, this advancing mechanism operates to advance the receptacles in step-by-step fashion and, ordinarily, the shaft and cams are rotated continuously to complete one full rotation in the time between one step and the next.

In the position of the cycle depicted, the coarse and fine gates controlling switches 74 and 76 are actuated to closed position and the indicator 12 has swept past the pointer 14 (see FIGURE 5) whereas the fine fill is continuing. After the fine fill control switch 40 is opened, the cam mechanism opens the switches 74 and 76 and next the control switches 78 and 80 are closed to interrogate the system for a net weight within the requisite limits. As stated before, the meter relay switch 42 is normally closed while the switch 44 is normally open. If the switch 42 has been actuated, but not the switch 44, both of these switches will be open and no signal will be applied to the reversible motor 60 to control the position of the pointer 16. If, on the other hand, the indicator 12 has not reached the pointer 16, showing a light net weight, the switch 42 will remain closed and the closed switch 78 will complete the circuit to the reversible motor 60 and drive it in one direction to incrementally move the pointer 16 to the right, that is, to close the fine gate later.

If both switches 42 and 44 have been actuated, the switch 42 will be open and the switch 44 will be closed so that the circuit completed through switch 44 and interrogator switch 80 will drive the motor 60 in the opposite direction to close the fine gate sooner. Next, the switches 78 and 80 are opened and the two switches 86 and 88 are closed to dump the product and to place the tare weight on the scale device.

If, now, the indicator 12 moves from any position, that is either from below the pointer 18 or from above the pointer 20 to the region between these two pointers or if it remains between these two pointers, the switches 42 and 44 will be respectively closed and opened and no signal will be applied to the reversible motor 62. If, however, the indicator 12 remains beyond the pointer 20, the reversible motor 62 will be driven in one direction to vary the gain of the amplifier 68 so as to move the indicator 12 incrementally toward the zero mark. If the indicator 12 has moved to a position below the pointer 18, the reversible motor 62 will be driven in such direction as to incrementally move the indicator 12 toward the zero mark. The various positions of the cycle as related to FIGURES 1-12 are shown in FIGURE 13 on a diagrammatic basis.

To further illustrate the operation of the device, reference will be had sequentially to FIGURES 1-12. Taking first FIGURE 1, the operation as shown therein is at that point in the cycle wherein the coarse and fine gates 52 and 54 have been closed and a proper amount of material M resides in the bucket assembly 28. At this point, the combined synchronizer and interrogator device supplies a signal to the dump motor 36 and to the tare weight motor 64, see particularly FIGURE 14 and FIGURE 2, to simultaneously dump the contents of the bucket 28 and to place the tare weight 66 on the scale platform.

When the contents of the bucket 28 have been dumped, the interrogator and synchronizer 72 (FIGURE 14) will determine whether the switch circuits 42 and 44 corresponding to the pointers 18 and 20 have been actuated. If the switch circuit 42 corresponding to the pointer 18 has been actuated, and the switch circuit 44 corresponding to the pointer 20 has not been actuated, indicating that the indicator 12 lies within the band defined between these two pointers 18 and 20, as is shown in FIGURE 3, no corresponding adjustments will be made since this indicates the tare weight of the bucket assembly plus the predetermined batch weight 66 is correct. The interrogator and synchronizer then actuates the mechanism to open both the coarse and fine gates indicated in FIGURE 4. As the indicator 12 sweeps past the pointer 14, as indicated in FIGURE 5, the coarse gate will be closed, leaving only the fine gate open. As soon as the pointer 16 has been swept by the indicator 12, the fine gate will close as shown in FIGURE 6 and the indicator 12 will come to rest as shown in FIGURE 6.

In FIGURE 6, however, the indicator has passed from between the band defined between the pointers 18 and 20 indicating that the net weight of material in the bucket 28 is too great. At this point, the interrogator determines that switch circuit 44 has been actuated and operates the reversible motor 60 in such direction as to move the fine gate control pointer 16 a predetermined increment back along the scale 22 as is indicated in FIGURE 7 so that on the next cycle, the fine gate will close sooner to dump less of the particulate bulk material into the bucket assembly 28.

As will be appreciated, FIGURES 7 and 1 correspond to identical points in the cycle with the exception that the correct weight was obtained during the cycle leading up to the disposition of parts as shown in FIGURE 1 whereas incorrect weight was obtained in the cycle leading up to FIGURE 7. Referring now to FIGURE 8, the step described in conjunction with FIGURE 2 is repeated, that is the bucket is dumped and the tare weight is added to the scale mechanism so that when the system comes to rest as shown in FIGURE 9, interrogation in the particular instance shown will indicate that both of the switch circuits 42 and 44 have been actuated indicating that the total weight of the bucket assembly 28 and of the fixed batch weight check 66 exceeds the predetermined value for which the optical meter relay zero point 26 was originally set. This circumstance indicates, of course, that some of the produce has remained in the bucket assembly 28 and this is usually caused by particle build up in the bucket which may slough off in subsequent cycles.

However, to accommodate for this incorrect tare weight, the reversible motor 62 is operated in such direction as to compress the effective length of the scale 22 in a predetermined increment so that the zero point 26 will tend to coincide with the tare weight as shown in FIGURE 9. The next cycle begins as shown in FIGURE 2 wherein the weight 66 is removed and the control gates opened to dump the particulate material and, as sequentially shown in FIGURES 11 and 12, the coarse and fine gates are sequentially closed and when the system comes to rest, the weight will be indicated as correct.

In this way, the system is checked on a cycle-to-cycle basis and is continuously up-dated to maintain very accurate weighing and to minimize rejects. A complete cycle of operation is indicated in FIGURE 13 wherein the Roman numeral I corresponds to FIGURES 1 and 7, the Roman numeral II corresponds to FIGURES 2 and 8, the Roman numeral III corresponds to FIGURES 3 and 9, the Roman numeral IV corresponds to FIGURES 4 and 10, the Roman numeral V corresponds to FIGURES 5 and 11, and the Roman numeral VI corresponds to FIGURES 6 and 12.

The system shown in FIGURE 15 includes the scale or weighing means 100 producing an electrical signal output as described hereinbefore proportional to the weight on the weighing pan or the like and this signal is applied as indicated by the reference character 102 to the amplifier 104 and this amplified signal is then fed as indicated by the reference character 106 to the optical meter relay 108. The optical meter relay 108 is shown in FIGURE 16 and will be seen to include the two pointers 110 and 112 and the movable indicator 114 which sweeps across the dial in response to the signal at 106. If the indicator 114 fails to reach the first pointer 110, a signal indicating underweight is applied by means of the conductor 116 to the reject mechanism 118 and this mechanism is effective in any conventional fashion to displace the underweight package in one direction from the product flow line. If, on the other hand, the indicator 114 sweeps past both the pointers 110 and 112, indicating an overweight condition, a signal will be applied through the conductor 120 to the reject mechanism 118 causing the overweight package to be displaced in another direction relative to the product line.

Thus, in the system of FIGURE 15 an optical meter relay in combination with the scale 100 and the amplifier 104 directly controls the reject mechanism and automatically maintains the accepted articles within the proper weight limits as indicated and determined by the two pointers 110 and 112.

One of the advantageous features of a system such as this is the fact that the operator has a continuous visual indication, by means of the face of the optical meter relay 108, of what is happening at the filling station. In other words, an operator may readily perceive by observing the optical meter relay a trend toward overweight or underweight conditions since the relative position of the indicator 114 at the end of each weighing step will directly indicate such trends. Additionally, the optical meter relay may utilize a clamping system wherein the indicator is held or fixed in the terminal position momentarily so that the indicator remains fixed for a relatively long period of time after each weighing operation so that the operator may more readily perceive trends in the weighing cycle.

The system shown in FIGURE 17 illustrates the manner in which automatic control of the filling mechanism 122 may be effected. In this figure, the dashed line 124 indicates the operation of dispensing the particulate material from the filling mechanism 122 to the scale or weighing means 126. As before, the electrical signal at 128 proportional to the weight on the scale is amplified at 130 and this signal in turn is applied as indicated by the reference character 132 to two optical meter relays 134 and 136. FIGURE 18 shows the two meter relays 134 and 136 and illustrates the manner in which filling control may be effected before an underweight or overweight condition occurs.

As shown in FIGURE 18, the two pointers 138 and 140 are set to show respectively underweight and overweight conditions and the indicator 142 is shown as falling between the limits established by these two pointers so that the package is allowed to pass in the conventional way. As before, if the pointer 138 is not swept by the indicator 142, an underweight signal will appear (FIGURE 17) on the conductor 144 to reject the package as underweight whereas if the indicator 142 sweeps both the pointers 138 and 140, a signal on the conductor 146 will reject the package as overweight. The meter relay 136 includes the two pointers 148 and 150 and the indicator 152. In the case of the meter 136, however, the sensitivity thereof is much greater than the sensitivity of the meter 134 so that the spacing between the pointers 148 and 150 even though it might be, say, identical with the spacing between the pointers 138 and 140 of the meter 134, represent a much smaller weight differential therebetween. That is to say, the pointers 148 and 150 between them represent a small fraction of the total weight represented between the two pointers 138 and 140 and preferably the fraction thereof is located substantially in the mid-point between the pointers 138 and 140. Thus, even though the condition prevailing in connection with the meter 136 prevails, that is that the pointer 148 has not been swept by the indicator 152, the indicator 142 on the meter face 134 would still be within the confines of that region between the two pointers 138 and 140. The pointer 148 when not swept creates a signal on the conductor 152 which is applied to the control mechanism 154 to increase the amount of material dispensed by the filling mechanism 122. If, on the other hand, the indicator 152 sweeps both the pointers 148 and 150, a signal will appear on the conductor 156 causing the control mechanism 154 to decrease the amount of material dispensed by the filling mechanism 122. Thus, the system as shown in FIGURES 17 and 18 allows the filling mechanism to be adjusted before a trend toward overweight or underweight becomes so large as to cause actuation of the reject mechanism. At the same time, underweight and overweight packages are still detected in the usual fashion.

I claim:
1. A particulate material batch forming apparatus comprising, in combination,
   a weight-sensitive device having a weight-proportional signal output,
   means for feeding bulk material to said weight-sensitive device including fast and slow feed mechanisms,
   means controlled by said signal output for stopping said fast and slow feed mechanism in sequential fashion to produce a terminal signal output having a value lying within predetermined limits, and
   means responsive to terminal signal outputs outside said limits for automatically varying the time of stopping said slow feed mechanism.

2. A particulate material batch forming apparatus comprising, in combination,
   a weight-sensitive device having a weight-proportional signal output,
   filling means for feeding bulk particulate material to said weight-sensitive means,
   means for periodically actuating said filling means and including fast and slow feed mechanisms,
   control means responsive to two sequential values of said signal output as said signal output increases to sequentially terminate actuation of said fast and slow feed mechanisms, said control means including means for varying the signal output value to which termination of said slow feed mechanism is responsive in response to terminal values of said signal output lying outside a predetermined band.

3. A particulate material batch forming apparatus comprising, in combination,
   a weight-sensitive device having a weight-proportional signal output,
   an amplifier connected to said signal output and having an output,
   filling means for feeding bulk particulate material to said weight-sensitive means,
   means for periodically actuating said filling means,
   control means connected to said amplifier and responsive to a predetermined value of said amplifier output as said signal output increases to terminate actuation of said filling means, said control means including means for checking the terminal value of said amplifier output and means for varying the gain of said amplifier in response to a terminal value of said amplifier output which lies outside a predetermined band.

4. A particulate material batch forming apparatus comprising, in combination,
a weight-sensitive device including a receptacle for the particulate material in which the receptacle is of a fixed tare weight, said weight-sensitive device also including mechanism producing an electrical output signal proportional to the weight of material in said receptacle,
filling means for feeding material into said receptacle,
means for periodically actuating said filling means to feed material into said receptacle,
control means responsive to said output signal for terminating the aforesaid actuation of said filling means to produce a terminal signal output lying between predetermined limits and corresponding to a batch weight of acceptable value, said control means including an amplifier having said output signal as an input,
means for dumping material from said receptacle,
means for loading said weight-sensitive device with a fixed weight equal to the desired batch weight prior to actuation of said filling means,
and means for adjusting the gain of said amplifier when the output signal produced by the tare weight of said receptacle plus said fixed weight lies outside predetermined limits.

5. A system for the high speed production of batches of particulate material which are of uniform weight, which comprises:
a weight-sensitive device including a weighing pan having a discharge gate and means for producing an electrical output signal proportional to the weight of material in said pan,
a filler head disposed above said weighing pan and including coarse and dribble feed controls whereby particulate material within said head may be fed, initially of each batch-producing cycle, at a high flow rate for coarse fill and, during the terminal portion of each cycle, at a low flow rate for dribble fill,
a meter coupled to said output signal of the weight-sensitive device, said meter including a face and a movable pointer for sweeping across said face as said output signal varies, said meter also including a pair of movable indicators adapted to be positioned at spaced points along the path swept by said pointer and indicator means for determining coincidence of the terminal position of said pointer with a prescribed weight of material in said pan,
said pair of movable indicators being connected to said coarse and dribble feed controls for terminating coarse and dribble feed at different times during each batch-producing cycle, and
means actuated by said indicator means for moving one of said pair of movable indicators in response to non-coincidence of said pointer with the prescribed weight of material.

6. The system defined in claim 5 including means for altering the length of the path swept by said pointer.

7. The system as defined in claim 6 wherein the means actuated by the indicator means moves that indicator coupled to said dribble feed control.

8. The system as defined in claim 7 including a member having a weight equal to said prescribed weight,
means for placing said member on the weighing pan prior to actuation of said coarse and dribble feed controls, and
means for actuating said means for altering the length of the path swept by said pointer to establish coincidence of the terminal position of said pointer with the prescribed weight when said member is on the weighing pan.

9. The system defined in claim 5 including means for altering the length of the path swept by said pointer,
a member having weight equal to said prescribed weight,
means for placing said member on the weighing pan prior to actuation of said coarse and dribble feed controls, and
means for actuating said means for altering the length of the path swept by said pointer to establish coincidence of the terminal position of said pointer with the prescribed weight when said member is on the weighing pan.

10. The system as defined in claim 5 wherein the means actuated by the indicator means moves that indicator coupled to said dribble feed control.

References Cited

UNITED STATES PATENTS

| | | | |
|---|---|---|---|
| 2,954,202 | 9/1960 | Bale | 177—122 X |
| 3,124,206 | 3/1964 | Burke | 177—165 X |
| 3,254,728 | 6/1966 | Aquadro et al. | 177—122 X |
| 3,259,199 | 7/1966 | Noble et al. | 177—210 X |
| 3,291,233 | 12/1966 | Mayer | 177—120 X |
| 2,497,015 | 2/1950 | Richardson | 177—63 |
| 2,714,472 | 8/1955 | Richardson | 177—50 XR |
| 2,751,180 | 6/1965 | Howard | 177—50 |
| 2,934,304 | 4/1960 | O'Neill | 177—63 |
| 3,117,639 | 1/1964 | Dreeben | 177—63 |
| 3,164,217 | 1/1965 | Peirce et al. | 177—47 XR |

FOREIGN PATENTS

| | | |
|---|---|---|
| 743,530 | 1/1956 | Great Britain. |
| 876,940 | 9/1961 | Great Britain. |

ROBERT S. WARD, JR., Primary Examiner

U.S. Cl. X.R.

177—45, 64, 122, 164, 210